T. MULLER.
DEVICE FOR THE PROTECTION OF REGISTERING MECHANISMS.
APPLICATION FILED OCT. 14, 1908.
922,019.
Patented May 18, 1909.
2 SHEETS—SHEET 1.
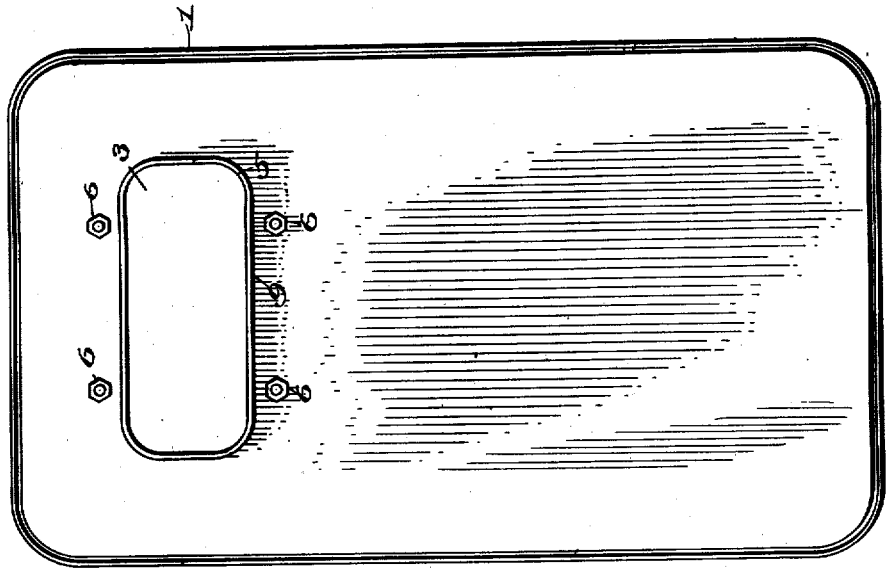
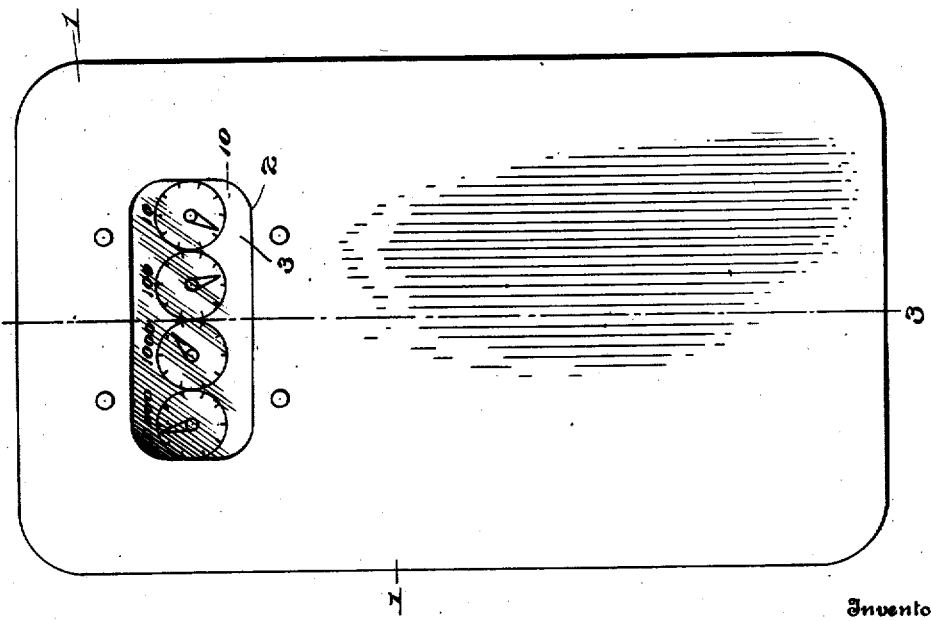

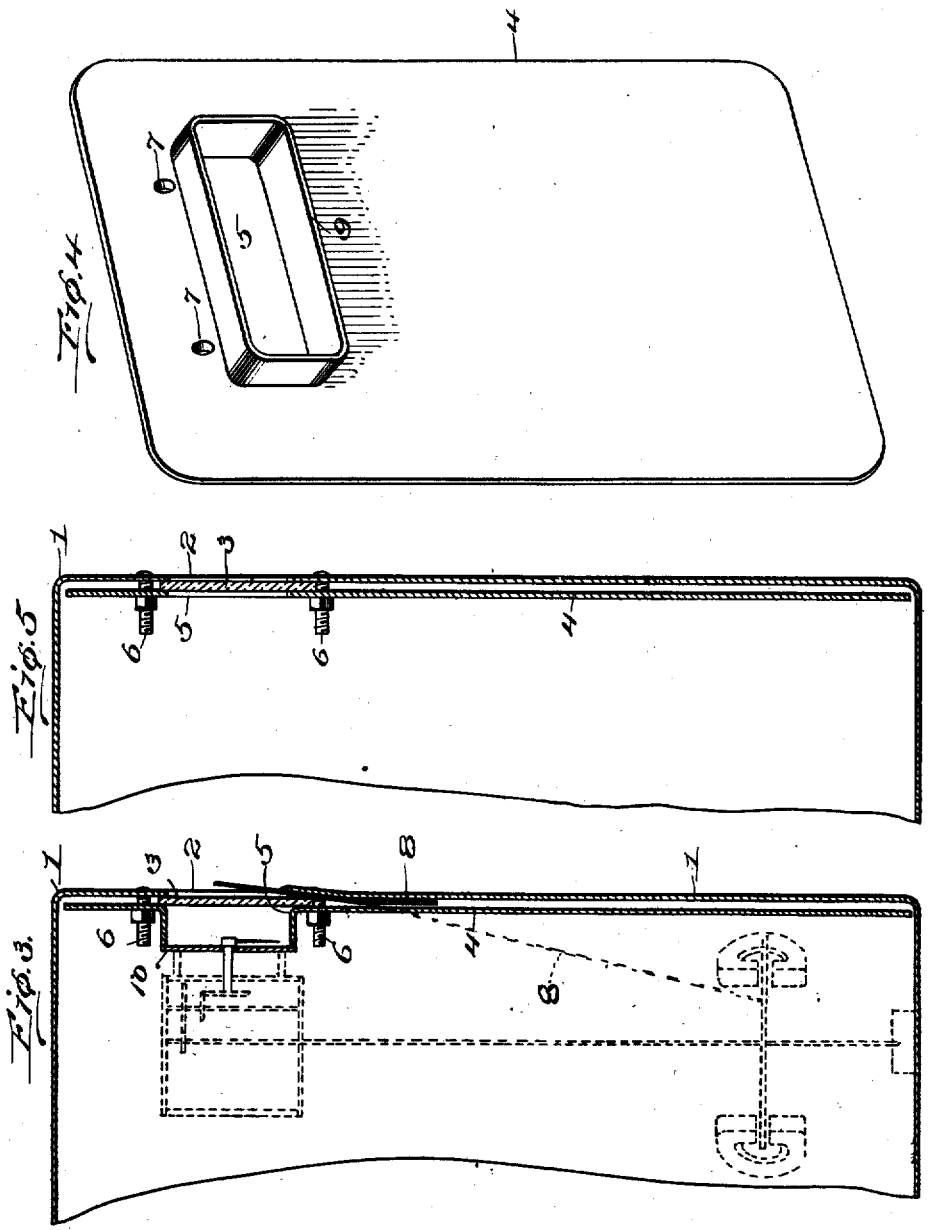

UNITED STATES PATENT OFFICE.

THEODORE MULLER, OF BROOKLYN, NEW YORK.

DEVICE FOR THE PROTECTION OF REGISTERING MECHANISM.

No. 922,019.            Specification of Letters Patent.           Patented May 18, 1909.

Application filed October 14, 1908. Serial No. 457,733.

*To all whom it may concern:*

Be it known that I, THEODORE MULLER, a citizen of the United States, residing at Brooklyn, in the county of Kings and State of New York, have invented certain new and useful Improvements in Devices for the Protection of Registering Mechanism; and I do hereby declare the following to be a full, clear, and exact description of the invention, such as will enable others skilled in the art to which it appertains to make and use the same.

This invention relates to improvements in devices for protecting registering mechanism, and more particularly to means adapted for preventing non-detectable access to the operating parts of a meter or other registering mechanism.

The object in view is the provision of cheap, simple and efficient means adapted for use in combination with any ordinary meter casing for deflecting any implement introduced between the casing and the transparent plate of the inspection opening thereof for preventing contact of such implement with any of the moving parts within the casing, the invention being especially well adapted for use in conjunction with casings of relatively thin sheet material.

With this and further objects in view, as will hereinafter be set forth in part and in part become obvious, the invention comprises certain novel constructions, combinations and arrangements of parts as will be hereinafter fully described and claimed.

In the accompanying drawing,—Figure 1 is a view in front elevation of an ordinary meter casing to which the present invention has been applied. Fig. 2 is a rear elevation of the casing detached and to which the invention is applied. Fig. 3 is a longitudinal, vertical, central section taken through Fig. 1 on the planes indicated by line 3, 3. Fig. 4 is a perspective view of the present improved shield detached. Fig. 5 is a view similar to Fig. 3 of a slightly modified form of the invention, the meter operating parts being omitted.

It has been found that various forms of registering mechanism, such as meters, may be tampered with and caused to register falsely or not to register at all without interfering with the passage through the meter of the medium to be measured, by the simple expediency, where an ordinary thin sheet metal casing, such as tin, has been provided, of introducing a straw or other like slender implement between the glass in the inspection opening and the surrounding metal, after the metal has been sprung slightly away from the glass. This fraudulent access to the meter has been rendered non-detectable by the very nature of the operation which was accomplished somewhat after the manner indicated by the dotted line position of the straw seen in Fig. 3.

Referring to the drawings by numerals, 1 indicates any ordinary meter casing of thin sheet material provided with the usual inspection opening 2 closed by the usual glass or other transparent plate 3. In the usual meter the plate 3 is retained in place by internally arranged clips or a detachable framing, so that when the edge of the material of the casing about the inspection opening is sprung away, after the manner indicated in Fig. 3, an implement may be readily introduced between the wall of the casing and the plate 3 and passed inwardly until, contacting with some moving part, it interrupts the operation of the meter. To obviate this, I provide a shield 4 which extends a considerable distance above and below the inspection opening and is formed with an opening 5, corresponding to and registering with the opening 2, the shield 4 being disposed in the rear of the plate 3 and serving to retain the plate in position in lieu of the ordinary securing means, although of course the ordinary securing means may be employed in addition to the shield. The shield 4 may be retained in position by suitable securing bolts 6, 6, fixed to the casing and passed through openings 7, 7, in the shield. Obviously, any suitable attaching means may be provided other than that described, and the shield may be made of any length and width preferred and adapted for deflecting the introduced implement so that the same will be compelled to take the course indicated at 8 in Fig. 3, being thus prevented from any possible access to any of the moving parts. By preference the shield 4 is formed of such dimensions as to fit snugly within and against the front face of the casing 1.

In order to add to the finished appearance of the meter, the shield 4 is preferably provided with an inwardly extending flange or cuff 9, which extends about the edges of the openings 5 and projects inwardly to the dial plate 10 of the meter.

Obviously, the plate 3 extends at all points beyond the edges of the opening 5 and hence the cuff 9 is designed more particularly for appearance and may be omitted as indicated in Fig. 5, the structure seen in Fig. 5 being exactly the same as that above described with the exception of the omission of the cuff 9, the same reference numerals having been applied to Fig. 5 and the same description applying thereto.

I find that sheet iron or ordinary commercial sheet tin is adapted for use in making the shield 4.

While I have limited the claims of the present application to the combination of the improved shield with meter casings of flexible sheet material, I reserve the right to present the generic principles of the invention without this limitation to specific combination in my companion, co-pending application Serial No. 457,734, filed October 14, 1908.

What I claim is:—

1. In a device of the class described, the combination with a flexible sheet material meter casing having an inspection opening in the front thereof, and a transparent plate closing the said opening, of a shield disposed between the transparent plate and the operating parts of the meter and formed with an opening corresponding to the inspection opening, said shield extending within the casing beyond the edges of the inspection opening substantially throughout the front of the casing for deflecting implements introduced between the transparent plate and the casing from access to the operating parts of the meter.

2. In a device of the class described, the combination with a flexible sheet material meter casing adapted to inclose meter mechanism and having an inspection opening, and a transparent plate closing said opening, of a guard surrounding the opening and lapping the transparent plate at the inside thereof and extending beyond the opening within the casing a distance substantially equal to the extent of the moving parts of the meter mechanism.

3. In a device of the class described, the combination with a flexible sheet material meter casing having an inspection opening, a transparent plate closing the same and meter mechanism inclosed by the casing, of a guard shield surrounding the opening and lapping the transparent plate inside thereof and extending therefrom beyond the moving parts of the meter mechanism.

4. In a device of the class described, the combination with a flexible sheet material meter casing having an inspection opening, a transparent plate closing the opening and meter mechanism inclosed by the casing, of a guard surrounding the opening and extending therefrom a distance sufficient to lie between the wall of the meter casing formed with the opening and all the moving parts of the meter mechanism.

5. In a device of the class described, the combination with a flexible sheet material meter casing adapted to inclose meter mechanism and having an inspection opening in the upper portion of the casing, and a transparent plate closing said opening, of a shield surrounding the opening and lapping the transparent plate from the inside thereof, said shield extending below the inspection opening a distance substantially equal to the lowermost extent of the moving parts of the meter mechanism.

6. In a device of the class described, the combination with a flexible sheet material meter casing having an inspection opening and a transparent plate closing the same, of a shield in the rear of said plate and formed with an opening corresponding to the inspection opening, said shield having its outer edges extending about the casing approximately in contact with the surrounding walls thereof.

7. In a device of the class described, the combination with a flexible sheet material meter casing having an inspection opening, a transparent plate closing the same, and meter mechanism within said casing, of a shield surrounding the opening and lapping the transparent plate on the inside thereof, and extending from the opening to points substantially the same distance therefrom as the farthermost moving parts of the meter mechanism, and a cuff extending about the portion of the shield surrounding the inspection opening and projecting rearwardly from the shield.

8. In a device of the class described, the combination with a meter casing having an inspection opening, a meter mechanism in said casing and a transparent plate closing said opening, the walls of the casing about the inspection opening being of such relatively thin material as to be susceptible of being sprung away from the transparent plate without breakage of such walls, of a shield lying entirely about the opening within the casing and lying in front of the meter mechanism and extending a distance from the inspection opening substantially equal to the extent of the meter mechanism in position for deflecting an instrument passed through the inspection opening and between the casing and transparent plate.

9. In a device of the class described, the combination with a meter casing and flexible sheet material meter mechanism therein, the meter casing having an inspection opening and a transparent plate closing the same, of a shield extending about the plate between the plate and meter mechanism and extending beyond the plate a distance equally substantially to the extent of the meter mechanism.

10. In a device of the class described, the combination with a flexible sheet material meter casing having an inspection opening and a transparent plate closing the same, of a shield in the rear of said plate and formed with an opening coincident with and corresponding to the inspection opening, said shield extending beyond the plate and having substantially the same facial area as the area of that face of the casing having the inspection opening.

11. In a device of the class described, the combination with a flexible sheet material meter casing having an inspection opening, a transparent plate closing said opening and meter mechanism inclosed by said casing, of an imperforate shield surrounding said opening and lapping the transparent plate on the inside thereof and extending away from the opening to points substantially as distant therefrom as the farthermost moving parts of the meter mechanism.

12. In a device of the class described, the combination with a flexible sheet material meter casing having an inspection opening, a transparent plate closing said opening and meter mechanism inclosed by said casing, of an imperforate sheet metal shield surrounding said opening and lapping the transparent plate on the inside thereof and extending away from the opening to points substantially as distant therefrom as the farthermost moving parts of the meter mechanism.

13. In a device of the class described, the combination with a flexible sheet material meter casing having an inspection opening in the upper portion thereof, a transparent plate closing the same and meter mechanism inclosed by said casing, of a shield lapping the lower edge of the transparent plate on the inside thereof and extending downwardly therefrom to points substantially as distant from the opening as the farthermost moving parts of the meter mechanism.

In testimony whereof I affix my signature in presence of two witnesses.

THEODORE MULLER.

Witnesses:
THOMAS DURANT,
EDGAR M. KITCHIN.